(12) United States Patent
Fabjanski et al.

(10) Patent No.: US 10,282,699 B2
(45) Date of Patent: May 7, 2019

(54) SELF-ORGANIZING SOFTWARE SCAN SCHEDULING BASED ON NEURAL NETWORK COGNITIVE CLASSIFICATION

(71) Applicant: International Business Machines Corporation, Armonk, NY (US)

(72) Inventors: Krzysztof G. Fabjanski, Cracow (PL); Marek Peszt, Cracow (PL); Agnieszka Tkaczyk, Cracow (PL); Piotr J. Walczak, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 15/181,448

(22) Filed: Jun. 14, 2016

(65) Prior Publication Data

US 2017/0357935 A1 Dec. 14, 2017

(51) Int. Cl.
  *G06Q 10/08* (2012.01)
  *G06N 3/08* (2006.01)
  *G06Q 10/06* (2012.01)

(52) U.S. Cl.
  CPC ............ *G06Q 10/087* (2013.01); *G06N 3/08* (2013.01); *G06Q 10/06* (2013.01); *G06Q 10/08* (2013.01)

(58) Field of Classification Search
  None
  See application file for complete search history.

(56) References Cited

U.S. PATENT DOCUMENTS

| 6,980,927 | B2 | 12/2005 | Tracy et al. |
| 7,340,776 | B2 * | 3/2008 | Zobel ................ G06F 21/577 713/188 |
| 8,955,036 | B2 | 2/2015 | Hugard, IV et al. |
| 9,049,207 | B2 | 6/2015 | Hugard, IV et al. |
| 2008/0027841 | A1 * | 1/2008 | Eder ................ G06Q 40/00 705/35 |
| 2010/0030777 | A1 * | 2/2010 | Panwar ............. G06Q 10/087 707/600 |
| 2012/0304248 | A1 | 11/2012 | Watts et al. |

OTHER PUBLICATIONS

Swartz et al., "Software Asset Management in Large Scale Organizations, Exploring the Challenges and Benefits", Bachelor of Science Thesis Software Engineering and Management, University of Gothenburg, Chalmers University of Technology, Department of Computer Science and Engineering, Göteborg, Sweden, Jun. 2013, 16 pages.

* cited by examiner

*Primary Examiner* — Aaron N Strange
*Assistant Examiner* — James A Edwards
(74) *Attorney, Agent, or Firm* — Monchai Chuaychoo (57) ABSTRACT

An approach for updating of a repetition frequency of a system scan operation. The approach calculates values of asset management factors based on results of the asset management factors from a current and a previously performed system scan operation. Groups of the computer systems are treated as node equivalents, and the asset management factors are treated as synapse equivalents of the node equivalents. The approach also feeds values of the factors and weighing values as input for determining an update value for the repetition frequency as output. The weighing value is adaptable via the learning capability of the neural network equivalent. Finally, the repetition frequency is updated using the update value by an activation function.

19 Claims, 8 Drawing Sheets

SELF-ORGANIZING SOFTWARE SCAN SCHEDULING BASED ON NEURAL NETWORK COGNITIVE CLASSIFICATION

BACKGROUND OF THE INVENTION

The invention relates generally to a method for system scan operations, and more specifically, to a method for updating of a repetition frequency of system scan operations.

The usage of software asset management tools is quite common in today's computer centers. Enterprises want and need facts in software license management and software license compliance. Software asset discovery tools, such as software use analysis, discover and report software installed on computing systems, like endpoints of any kind. In order to receive a list of software installed on each endpoint managed by a software asset management tool, the software asset management tool has to be configured carefully and software scan periods have to be defined and maintained. These periods are most often set empirically based on administrators' preferences and experiences. It is hard to predict what a perfect balance between keeping the list of installed software on an endpoint up-to-date, and avoiding performance issues on the computing endpoints. Each scan has to use some CPU, RAM, and hard disk resources. Normally, this disturbs or slows down user activities, and thus, it has a negative effect on the user experience with a certain device.

If, for example, the system scans are done relatively seldom, a software package may be installed on an endpoint, may be used, and may be de-installed before the next system scan will be conducted. Thus, the software package may have been used more or less intense between two system scans but may not have been reported according to software license compliance rules.

Additionally, there is a classical conflict between an excessive system scan on the one hand side, and the requirement for system resources on the endpoint and at a central software asset management tool side. The proposed solution is addressing exactly this dilemma.

SUMMARY

According to one aspect of the present invention, a method for updating of a repetition frequency of system scan operations for a computer system using an asset management system may be provided. The method may comprise calculating values of asset management factors based on results of comparisons of related ones of the asset management factors from a current system scan operation and a previously performed system scan operation. Groups of the computer systems may be treated as node equivalents of a neural network equivalent. The asset management factors may be treated as synapse equivalents of the node equivalents.

The method may further comprise feeding values of the asset management factors and related weighing values for each of the asset management factors as input into a summing module for determining an update value for the repetition frequency as output. The weighing value may be adaptable via the learning capability of the neural network equivalent. Last but not least, the method may comprise updating the repetition frequency using the update value by an activation function.

According to another aspect of the present invention, a system for updating of a repetition frequency of system scan operations for a computer system using an asset management system may be provided. The system may comprise a calculation unit adapted for calculating values of asset management factors based on results of comparisons of related ones of the asset management factors from a current system scan operation and a previously performed system scan operation. The calculation unit may also be adapted for treating groups of the computer systems as node equivalents of a neural network equivalent and for treating the asset management factors as synapse equivalents of the node equivalents.

Furthermore the system may comprise a summing unit adapted for receiving values of the asset management factors and related weighing values for each of the asset management factors as input for determining an update value for the repetition frequency as output. An activation unit may be adapted for adapting the weighing values via the learning capability of the neural network equivalent, and an updating unit may be adapted for using the update value for an adaption of the repetition frequency by the activation function.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions can be used:

The term 'system scan operation' denotes a scanning process to identify installed software in a given hardware system. The installed software can be, but is not limited to, a software package, a software program a micro-service, and it may be an end-user program or a system program. Basically, there are no limits regarding the type of software program. Such software scan processes or operations can typically be performed by a software agent or scan agent being executed on the hardware system—or virtual system—to be inspected. Often, the scan agent can be controlled by an asset management system or, in other cases, by a systems management tool.

The term 'repetition frequency' denotes how often a software scan operation can be performed. For example, it can be on a daily basis, a weekly or a monthly basis. Typically, an operator has to care about the software scan operations; at least he has to configure the asset management system.

The term 'computer system' denotes computer hardware being adapted to execute software. It can, for example, be a server, a network system, a cluster of computers or any endpoint device, like a mobile device. A mobile device can, for example, be a desktop computer, a notebook computer, a smartphone, a smart-watch or a camera. Basically, every smart device being adapted for executing software—including devices from the Internet-of-Things universe—can count as a computer system in the sense of this document. The same can apply to a virtual machine.

The term 'asset management factors' denotes control parameters for an automated management of the repetition frequency of the system scan operations. There are different factors influencing the repetition frequency, as explained in more detail below.

The term 'neural network equivalent' denotes a model used for setting up the proposed method. Elements of a neural network model are used in order to find a more elegant way to control automatically the scan frequency—or repetition frequency of system scan operations—if compared to known technologies. The neural network concept is used as a thought model for solving the problem of an automatic management of the scan frequency to better balance the requirement of compliance and the need for system resources for the scan operations.

In this sense, also the term 'synapse equivalent' and the term 'node equivalent' can be interpreted as elements of a neural network in a biological sense. The usage will become obvious if viewed in light of the accompanying drawings and the related explanations.

The term 'weighing value' denotes a value of a factor—in particular an asset management factor—applied to an asset management factor value. Each asset management factor may be folded mathematically with a weighing value, e.g., by the mathematical operation of a multiplication.

The term a 'product instance' denotes a copy of a software program. Multiple instances can be installed on one hardware system, even if only one instance can be used actively.

The term 'unconfirmed instance' denotes an instance of a software, which may typically belong to a software package—a plurality of different software items belong together—but which actually does not have a corresponding package. It can be a left-over from a previous installation of a software package.

The term 'successful system scan operation' denotes a system scan operation being performed with a regular defined, error-free end. The system scan operation may not be stopped because an error occurred.

The term 'duplicate agent' denotes a second version scan agent running or at least being installed on a computer system. Typically, only one scan agent can be executed on a hardware system. However, due to user copy actions of complete directory trees, a second scan agent version can be available on a specific hardware unintentionally.

The term 'quarter report submission factor' can denote a parameter related to a time when a quarterly report of software assets is due.

The proposed method for updating of a repetition frequency of a system scan operation can offer advantages and technical effects:

By treating each computer system to be scanned for installed software as a node of a neural network and by treating the asset management factor as synapses, an innovative way of defining scan periods, e.g., repetition frequency of the system scan operations and its adaption to changing environmental or usage parameters measured in form of the factors can be provided. The scan frequency can be adapted depending on conditions defined by the usage of the computer system or endpoint. The scan frequency can reflect an unlimited number of factors. However, it has been experienced that approximately 10 factors deliver a solid basis for a dynamic adaption of weighing for the different asset management factors.

The proposed method and related system not only allows treating the computer systems and factors as a 1-dimensional neural network with a fixed number of factors but also a fixed way for the individual weighing of the factors. The specific approach allows a second variant of the fundamental idea which may be seen as a 2-dimensional neural network, in which the weights of the factors can be adjusted dynamically, in the sense of machine learning, over time. Thus, the weights become a result of the experience of the system by comparing results of a current system scan operation with a previous system scan operation. No additional adjustments by operators are required in order to optimize the repetition frequency of system scan operations.

The approach allows also for a third variant in which the computer systems can be grouped into different classes. As an example, all endpoints of the Information Technology (IT) department can belong to one class representing one group of computer systems, whereas all endpoints of the Human Resources (HR) department belong to a different class/group, respectively. The weights for the factors of the different classes can be defined differently. It may be assumed that computer systems being used in an HR department can live in a much more stable environment; thus, the repetition frequency of system scan operations can be lower if compared to the IT department. The proposed approach will actively learn such a behavior of the overall system.

It should be noted that by the proposed embodiments a balance between the need regarding frequent system scans for highest compliance alignment with regulatory and license rights requirements and a system load imposed by the scan activities—on the endpoint side and a the server, in particular a software asset management server—may be achieved.

According to one optional embodiment, each of the groups can comprise only one system and wherein the weighing values can be static. Such an implementation can be the simplest form of the inventive concept. It can be interpreted as the case of a 1-dimensional neural network with fixed weighing values for the asset management factors, or in short "factor."

According to one permissive embodiment, each of the groups can comprise one system and the weighing values can be determined dynamically during or after each iteration of subsequent system scan operations. Hence, the results of subsequent system scan operations can be compared under various aspects of the asset management factors, and the individual asset weights for different asset management factors may be adjusted. This can be seen as a model using a 1-dimensional neural network equivalent with a dynamically adapted weight.

According to one advantageous embodiment, at least one of the groups can comprise more than one computer system. For example, the computer system of a department or of similar user types can be grouped together and treated as the group of computer systems. Then, the weighing factors can have the group values as 2-dimensional input parameters. This can expand the used model of a neural network equivalent into another dimension.

In addition and according to one additionally advantageous embodiment, the weighing values can be determined dynamically after each iteration of the subsequent system scan operations. This can be done in analogy to the 1-dimension neural network equivalent with dynamic weight value for the asset management factors. It adds greater adaptability and learnings capabilities to the repetition frequency of the system scan operations over previous embodiments.

According to one preferred embodiment, the asset management factors are selected out of the group comprising a number of software packages installed on the computer system, a number of included and/or excluded directories on the computer system, a number of included and/or excluded local product instances on the computer system, an adherence of the computer system to a group, a number of computer systems to which an agent belongs performing the system scan operations, a list of unconfirmed instances, a number of recently performed successful system scan operations, a number of duplicate agents, a last agent response time of the agent, and a quarter report submission factor. These are 10 selected asset management factors. Any other number, e.g., more, other or changed asset management factors can be used in the context of the proposed solution. Using varying factors, the method can be adapted to varying requirements depending on different usage patterns for the hardware systems. Basically, a self-learning system for software asset management is implemented.

According to one additionally preferred embodiment, the computer system can be selected out of the group comprising a personal computer, a server computer, a mobile device, e.g., a tablet computer, smartphone, smartwatch, sensor in Internet-of-Things environment, a disk subsystem, network system, a peripheral system to the computer system, etc. Basically, any computing device adapted for executing software can be used. Thus, the embodiments are not limited to a usage to any specific hardware systems or, computing endpoints.

In the following, a detailed description of the figures will be given. All instructions in the figures are schematic. Firstly, a block diagram of an embodiment for updating of a repetition frequency of a system scan operation is given. Afterwards, further embodiments, as well as embodiments of the system for updating of a repetition frequency of system scan operation, will be described.

Figure 1:
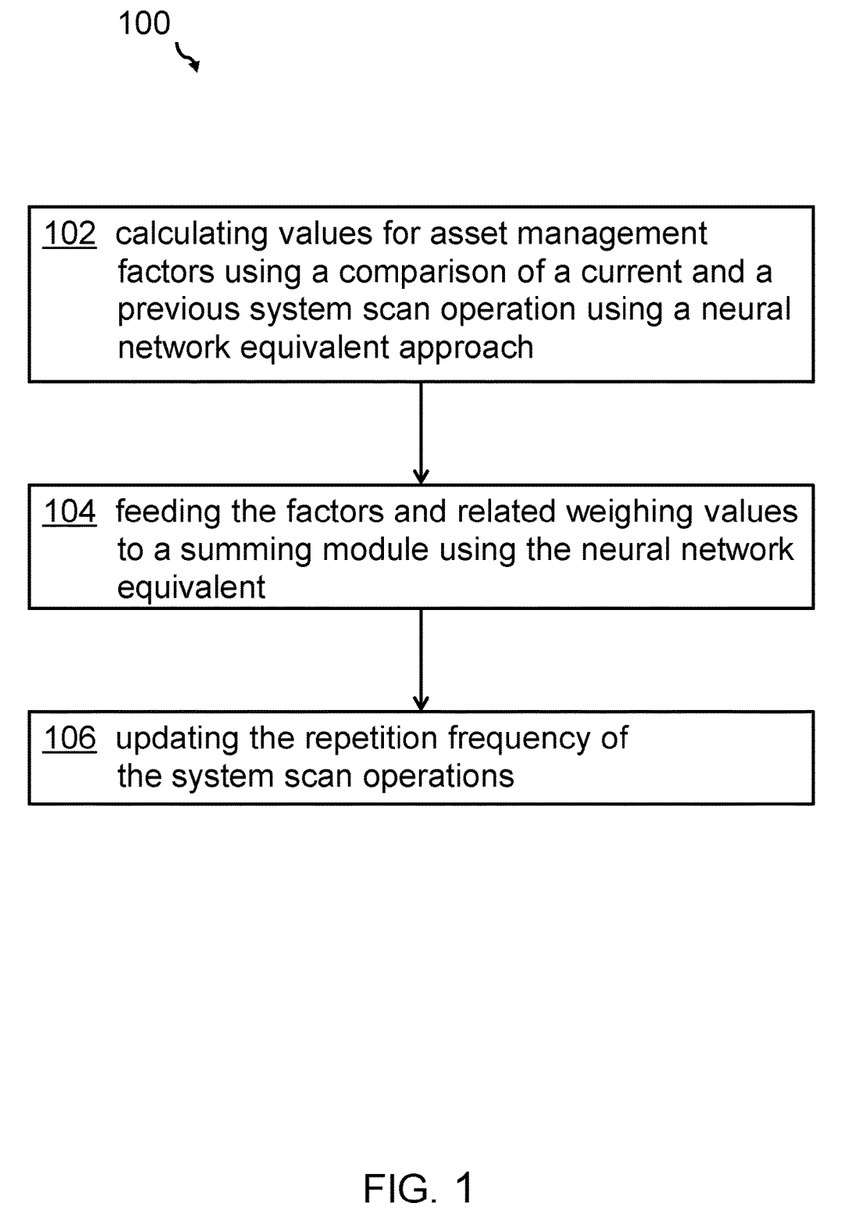
FIG. 1 shows a block diagram of an embodiment of the method for updating of a repetition frequency of system scan operations for a computer system.

FIG. 1 illustrates a block diagram of an embodiment 100 for updating of a repetition frequency of a system scan operation for a computer system. The embodiment 100 comprises calculating, 102, values of asset management factors, in particular 10 exemplary asset management factors—based on results of comparisons of related ones of the asset management factors from a current system scan operation and a previously performed system scan operation. The groups of computer systems are treated as node equivalents of a neural network equivalent and the asset management factors are treated as synapse equivalents of the node equivalents. The embodiment 100 comprises further feeding, 104, values of the asset management factors and related weighing values for each of the asset management factors as input into a summing module for determining an update value for the repetition frequency as output. Thereby, the weighing value is adaptable via the learning capability of the neural network equivalent. Additionally, the embodiment comprises, updating, 106, the repetition frequency using the update value by an activation function.

Figure 2A:
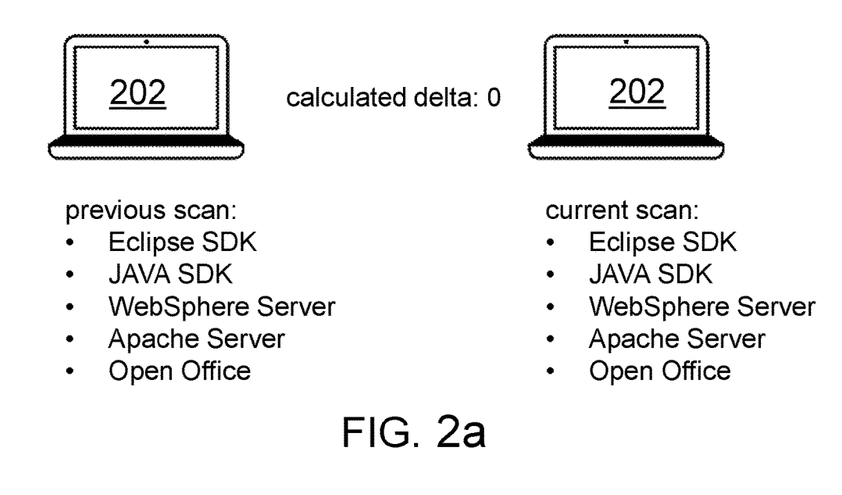
FIGS. 2a and 2b each show an example of a comparison between a previous system scan operation and a current scan operation.

FIGS. 2a and 2b each illustrate an example of comparisons between a previous system scan operation—or in short: scan—and a current scan. An endpoint 202, e.g., a personal computer or notebook computer has had a series of software packages installed as a previous scan revealed. In this example, the following packages have been installed: Eclipse SDK (software development kit), Java SDK, WebSphere server, Apache server, and Open Office package, as can be seen from the left side of FIG. 2a. During a current scan, the same software packages were found on the endpoint 202, as can easily be seen. Thus, the calculated data between the two scans in light of the installed software packages is shown as "0".

Figure 2B:
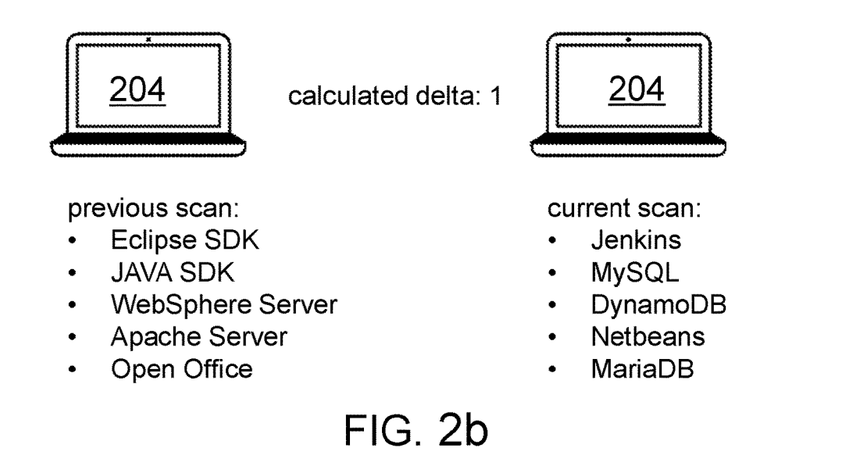

The calculated difference with respect to FIG. 2b is shown as "1." With respect to the previous scan, there is no difference to the previous scan of FIG. 2a. However the current scan in FIG. 2b shows that now the following software packages are installed at the endpoint 204: Jenkins, MySQL, DynamoDB, NetBeans and MariaDB wherein none of the previous scan operation are installed. Accordingly, none of the software packages are identical between the previous scan and the current scan. Therefore, the calculated delta value is shown as "1" or 100%. The percentage may vary depending on the amount of equal and/or different software packages.

Figure 3:
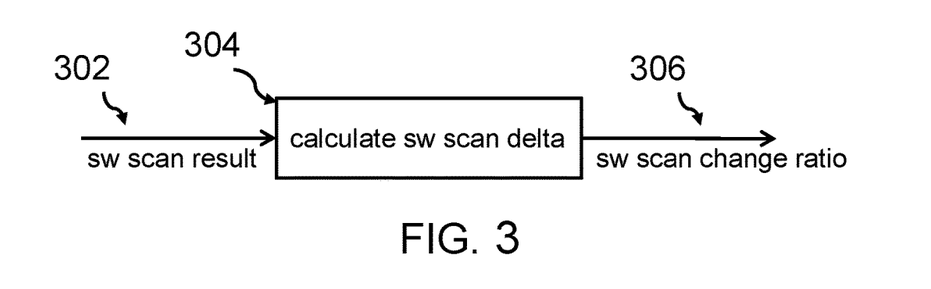
FIG. 3 shows symbolically the determination process of a determination of the factor "calculated delta" for installed software packages.

FIG. 3 illustrates symbolically the determination process of the factor "calculated delta" for installed software packages. As input 302 the software scan results are used, the software scan data are calculated, 304, and the software scan change ratio 306 is the output of the process of the figure.

Figure 4:
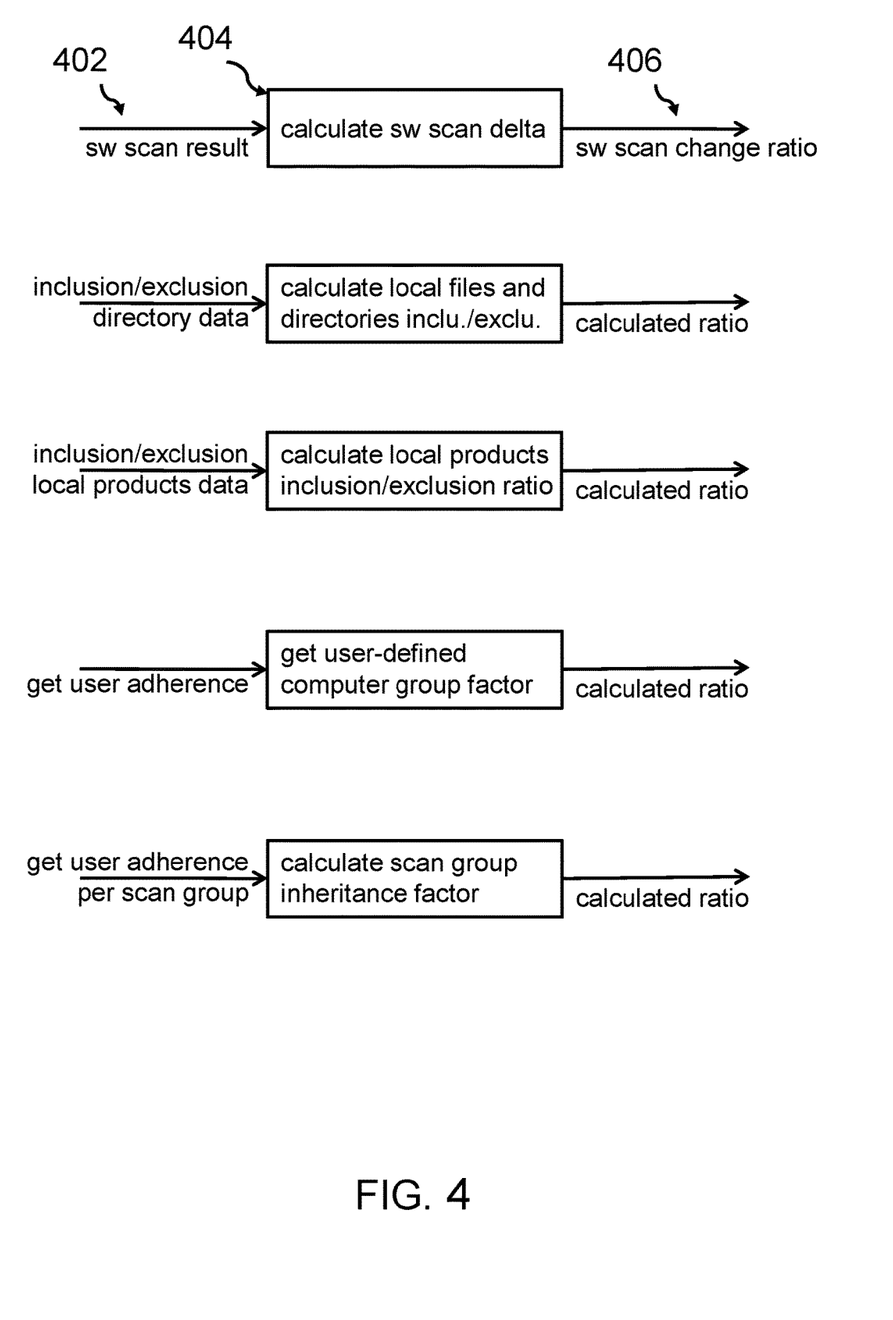
FIG. 4 shows determination processes for five asset management factors including the software scan change ratio of FIG. 3.

FIG. 4 illustrates determination processes for five factors including the software scan change ratio of FIG. 3. All of these processes 404 use input values 402 and return output values 406. It should be noted the reference numbers are shown only for the top process.

Again, the first factor or asset management factor is associated with a local software scan delta. If the software scan delta, which is the comparison between the list of software detected in the current software scan and the list of software detected during the previous scan, is above a threshold that could be defined as a static value in the algorithm, the factor will be scored as 1. If the software scan delta is equal to 0, the factor will be 0 as well. Otherwise, the factor will be −1.

The second factor is associated with the number of included/excluded directories for the scan operation. The number of these directories is used as input value, the calculation of the local files and directories that are included and/or excluded are calculated, and the calculated ratio is output as the result. The factor is scored as 1 when there is a difference that exceeds a predefined threshold value, 0 when there is no difference, and −1 otherwise.

The third factor is associated with the number of included/excluded local product instances. As input values, the inclusion/exclusion of local product data is used, the local products inclusion/exclusion ratio is calculated and output as calculated ratio. The same logic as above has been applied here: the factor is scored as 1 when the difference exceeds a predefined threshold value, 0 when there is no difference, and −1 otherwise.

The fourth factor is associated with an adherence of a computer to a scan/report group. This coefficient can change in binary mode. The process calculates a scan group inheritance factor which can be 1 or 0. Every time the scan agent is reassigned to a different computer group it is scored as 1; otherwise it is scored as 0.

The fifth factor is associated with the number of computer systems in a scan group to which a scan agent belongs. This coefficient is calculated if a change is detected between the "n-th" and "n−1-th" iterations of the system scan operation. In case of a higher number of computer systems assigned to the scan group to which the current agent belongs, the factor will be scored as 1. The factor will be scored as 0 when there is no change and the factor will be scored as −1 otherwise.

Figure 5:
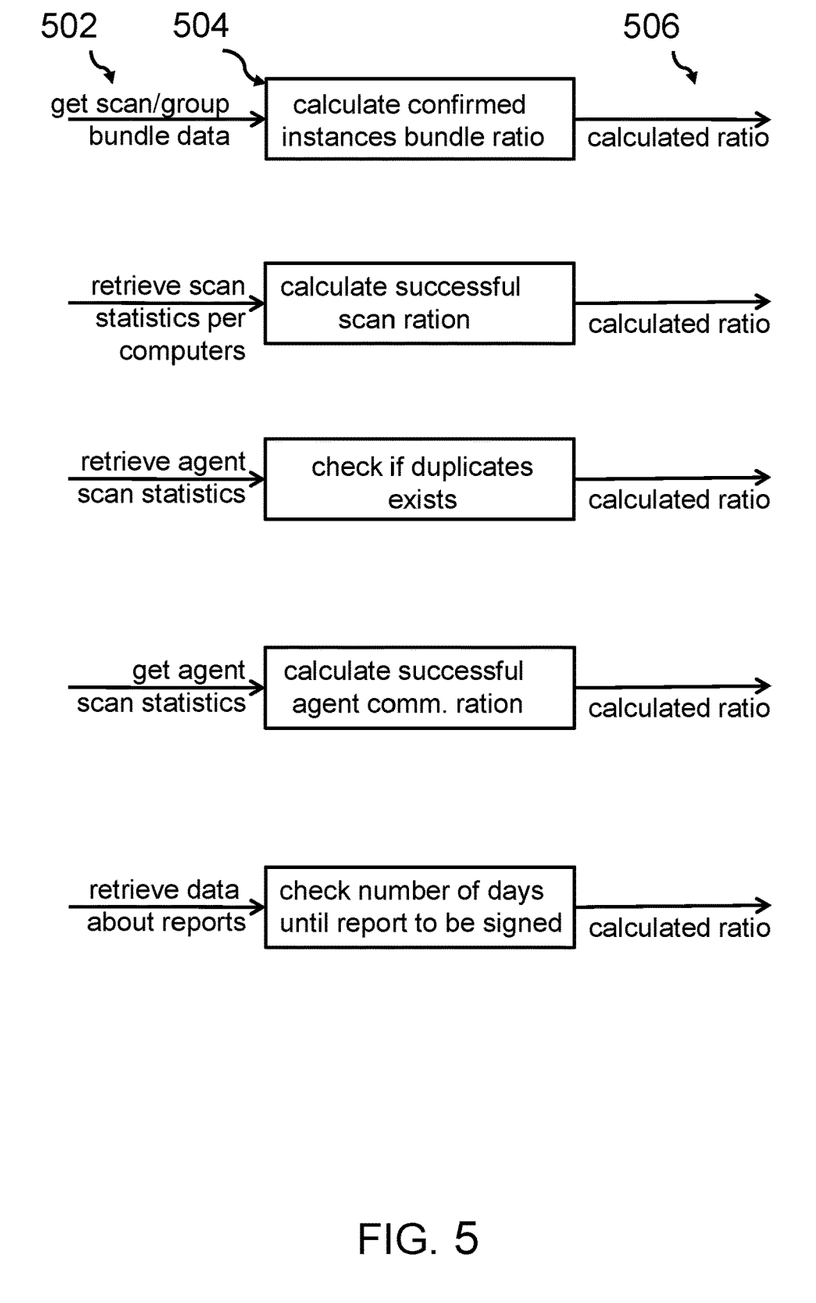
FIG. 5 shows a second group of asset management factors.

FIG. 5 illustrates a second group of factors. Again, the processes 504 receive input values 502 and generate output values 506 in the same way as the processes 404 of FIG. 4. The sixth factor is associated with unconfirmed instances. The factor is scored as 1 if the list of unconfirmed instances is increased. If the list of unconfirmed instances does not change, the factor is scored as 0. The factor is scored −1 otherwise.

The seventh factor is related to a number of recently performed successful agent scans, in particular the percentage value of the successful agent scans. This factor is scored as 1 if the percentage of successful agent scans across a plurality of parallel executed software scans by a plurality of scan agents is going down in comparison to the previous iteration of the software scan operation. The factor is assigned 0 if it is not changed and −1 otherwise. It should be noted that one scan agent should be available on a specific computer system.

The eighth factor is related to the number of duplicated agents. This factor changes in binary mode. It means that every time the duplicated agent is present in the infrastructure, the factor would be scored as 1 otherwise it will be scored as zero.

The ninth factor is related to the last agent response time. This factor is scored as 1 if the response time is no longer than the response time of the previous iteration. If the response time is the same, the factor is scored as 0. For all other cases the factor is scored as −1.

The 10th factor is a report submission factor that is related to a specific amount of time, e.g., a quarter of a year. This can be a typical time during which audit reports are generated. The process to determine this factor checks the schedule of the quarterly reports. In practice, an operator can schedule reports more frequently or more less. Additionally, computer systems can belong to different computer groups and for each computer group a separate report, with its individual schedule, can be generated. This factor is based on a calculation of the number of days until the report should be produced, signed, or delivered. The previous scan iteration results can be compared with the current scan results and normalized such that the difference in time between the occurrences of the previous scan compared to the current scan duration is not taken into account. If it turns out that the repetition frequency of the system scan operations of the report submission has been increased, the factor is scored as 1. If there is no difference, the factor is scored as 0. In other cases, the factor is scored as −1.

Figure 6:
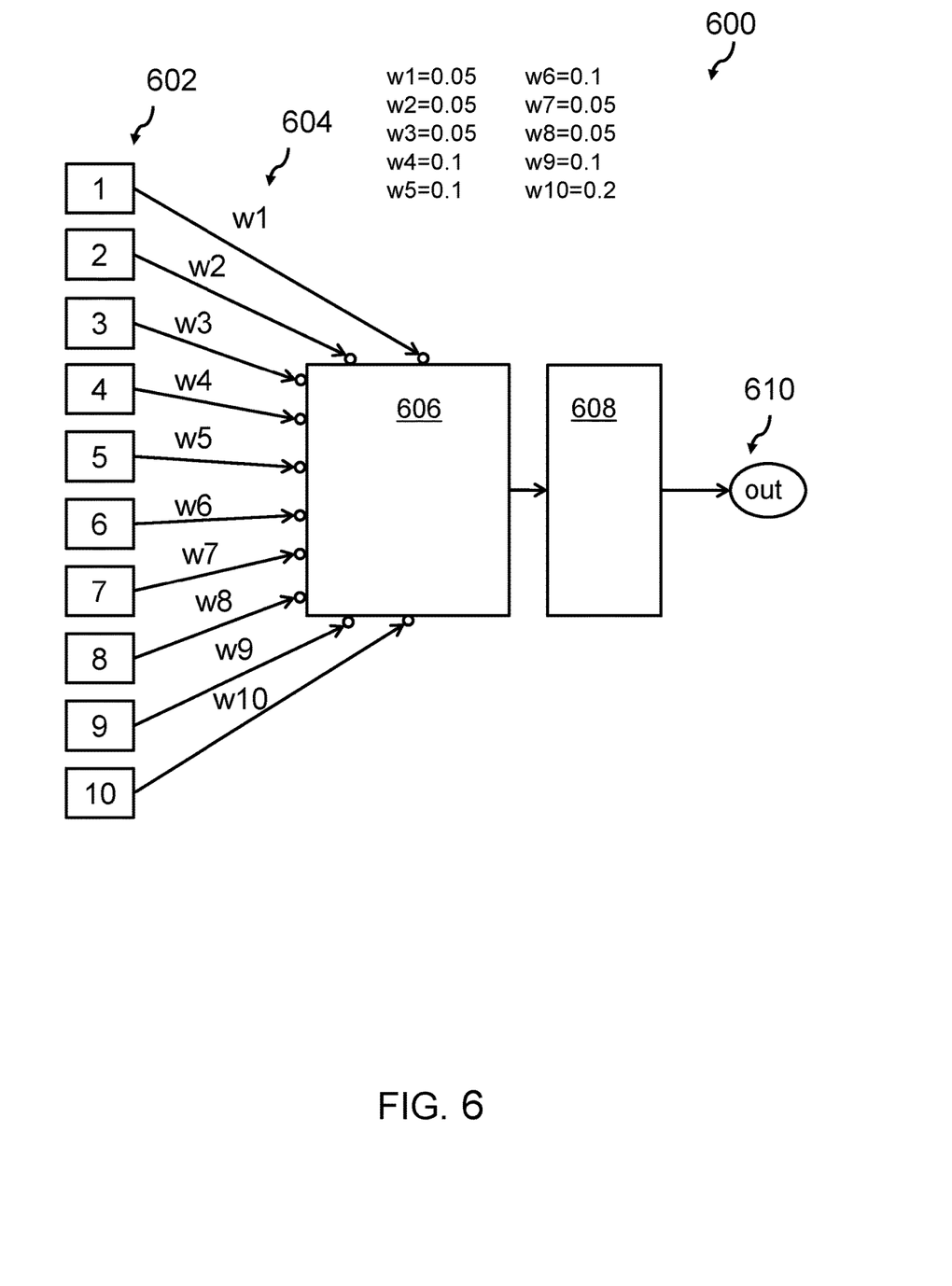
FIG. 6 shows a block diagram illustrating the similarities of neuron equivalents of a neural network equivalent when the asset management factors are linked to a summing block.

FIG. 6 shows a block diagram illustrating the similarities of neurons if the asset management factors 1 to 10 (602) are linked to a summing block 606 and representing the respective endpoint. To the factor values 602 individual weights 604 are applied. The complete set-up comprising the factors 602, the summing block 606, the weights 604, the activation block 608 and the output 610 are referred to by reference numeral 600. Because the weights are assumed to be static—in this first variant—this model can be regarded as a 1-dimensional neural network system or an equivalent thereof. In this variant of the embodiment, weights are associated with each factor. Only comparisons between the previous and the current system scan operation are used for individual factor values. If a respective change is positive, the factor will be scored as 1, as explained in the context of FIGS. 4 and 5. If it is regarded as neutral, the factor will be scored as 0. Otherwise, the factor would be scored as −1. The summing block 606 sums up all numbers with respective weights. In this variant of the embodiment, the activation function 608 is skipped as the obtained results values are directly interpreted on the output 610. In this case, "1" indicates that the scan frequency will be increased, "0" indicates that the scan frequency will remain unchanged, and "−1" indicates that the scan frequency will be decreased. The amount of increase or decrease can be predefined. It should also be noted, that in this first variant the scan frequency is determined only for a single computer system and not for a computer/scan group.

An alternative embodiment can be interpreted as a 1-dimensional neural network system with dynamic weights in contrast to the static weights discussed in the paragraph above. This variant of the embodiment assumes that weights can be changed after each iteration of the system scan operation. Similar logic is used as in the first variant of the embodiment, however, this time the factor changes dictate future weight values of the respective factors. Each individual factor which changes in the same way as discussed above, however it's change will not be redirected to the summing block but will reflect the weight of the associated factor value. Weights can be set for the initial system scan operation or first iteration for the same values for the first system scan operation, which can be 0.5. After each iteration, the weights are either increased or decreased according to the values obtained from the associated factors. Each weight can be changed in a predefined range, e.g., between 0 and 1. The change step can be the same for the weights. The steps can, e.g., be done as 0.01, 0 or −0.01 increment or decrement. It should be noted that if a factor is set to 1 and the signal received from the factor indicates an increment, the factor remains unchanged. A comparable situation applies if the weight is 0 and the signal from the factor indicates a decrease, i.e., the factor remains 0. The summing block 606 sums up the factor values folded with the weights—e.g., by multiplication—and passes the results to the activation function 608. The activation function 608 returns three possible values based on assumed exemplary threshold values:

−1 for factor values ranging from 0 to 0.399
0 for factor values ranging from 0.4 to 0.599
+1 for factor values ranging from 0.6 to 1.

After returning the determination value, the "divide and conquer" algorithm is applied to increase (a) or decrease (c) or do not change (b) the repetition frequency of the system scan operations for a particular computer system, e.g., using an increase or decrease factor (e.g., 0.5 and/or 2).

Figure 7:
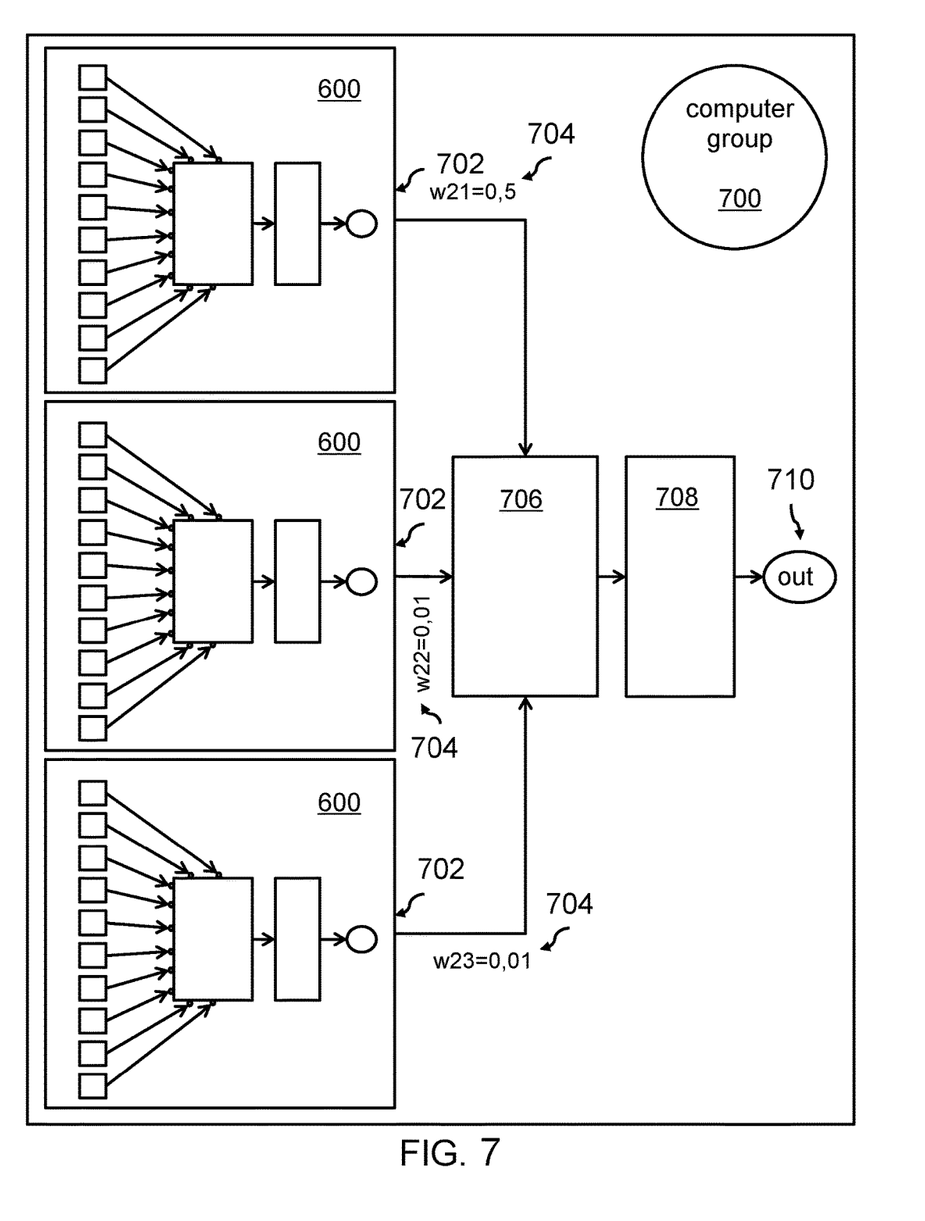
FIG. 7 shows the usage of a two-dimensional neural network system as model applying dynamic weights in each dimension.

FIG. 7 uses a 2-dimensional neural network system as a model applying dynamic weights in each dimension. In this variant of an embodiment, one may reuse either the first or the second embodiment if the first dimension of the network equivalent. Thus, reference numerals 600 is used for these building blocks which deliver output values 702. The second dimension is built from the computer/scan groups 700. As an example, FIG. 7 shows a computer/scan group with three systems 600. It can be seen that the output of a single neuron equivalent 600 from the first dimension is treated as the input (synapse) of the computer/scan group neuron equivalent (second dimension). Each input of the computer/scan group neuron equivalent generates a signal either to increase the repetition frequency of system scan operation, to not change it, or to increase it. The weights 704 are associated which each synapse equivalent value in the way that if the previous signal was in alignment with the activation function 708 output from the computer scan group neuron equivalent, the weight is automatically increased by 0.01 awarding that particular synapse equivalent input. If the signal was in alignment with the activation function 708 output 710 from the computer/scan group neuron equivalent 706 for the second time in a row, the weight is neither increased nor decreased, preserving its current value. The weight is decreased by 0.01 in other cases.

Figure 8:
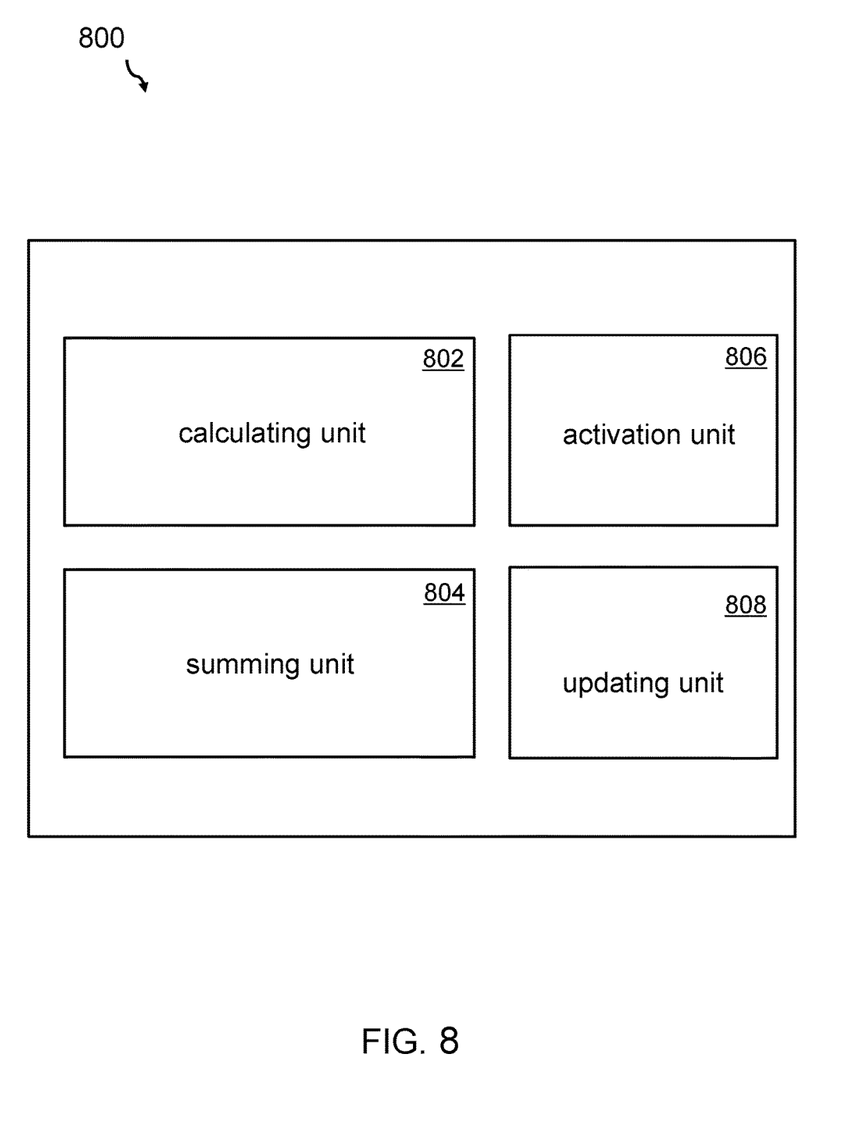
FIG. 8 shows a block diagram of system for updating of a repetition frequency of the system scan operation.

FIG. 8 shows a block diagram of system 800 for updating of a repetition frequency of the system scan operation according to an embodiment of the proposed solution. The system comprises calculation unit 802 adapted for calculating values of asset management factors based on results of comparisons of related ones of the asset management factors from a current system scan operation and a previously performed system scan operation. Thereby, the calculation unit 802 is also adapted for treating groups of the computer systems as node equivalents of a neural network equivalent and for treating the asset management factors as synapse equivalents of the node equivalents.

The summing unit 804 is adapted for receiving values of the asset management factors and related weighing values for each of the asset management factors as input for determining an update value for the repetition frequency as output. An activation unit 806 is adapted for adapting the weighing value via a learning capability of the neural network equivalent, and an updating unit 808 is adapted for using the update value for an adaption of the repetition frequency by the activation function.

Figure 9:
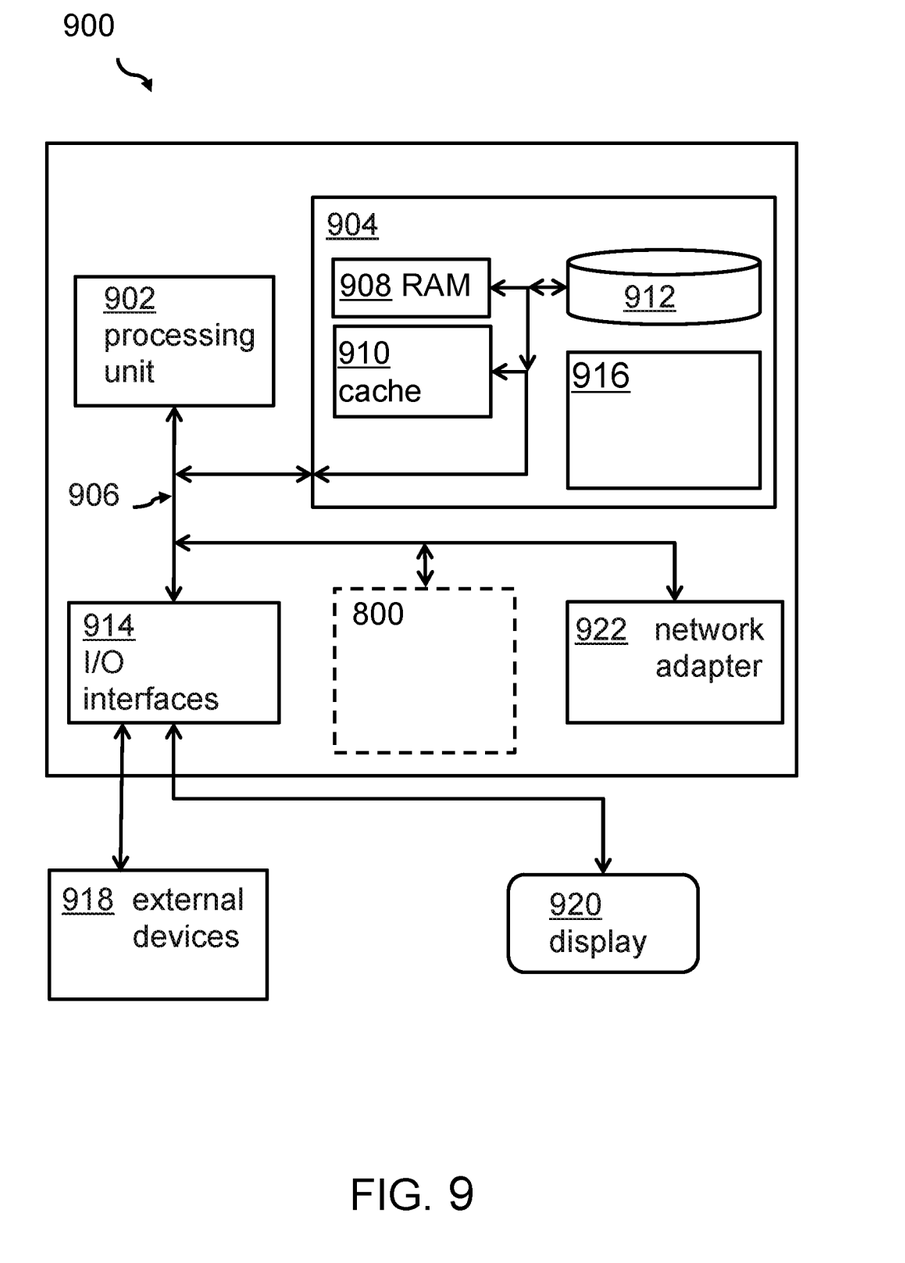
FIG. 9 shows a block diagram of an embodiment of a computer system useful in the context of the inventive concept.

Embodiments of the invention can be implemented together with virtually any type of computer, regardless of the platform, suitable for storing and/or executing program code. FIG. 9 shows, as an example, a computing system 900 suitable for executing program code related to the proposed method.

The computing system 900 is only one example of a suitable computer system and is not intended to suggest any limitation as to the scope of use or functionality of embodiments of the invention described herein. Regardless, computer system 900 is capable of being implemented and/or performing any of the functionality set forth hereinabove. In the computer system 900, there are components, which are operational with numerous other general purpose or special purpose computing system environments or configurations. Examples of well-known computing systems, environments, and/or configurations that may be suitable for use with computer system/server 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 900 is shown in the form of a general-purpose computing device. The components of computer system/server 900 may include, but are not limited to, one or more processors or processing units 902, a system memory 704, and a bus 706 that couples various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. Computer system/server 900 may further include other removable/non-removable, volatile/non-volatile computer system storage media. By way of example only, storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the invention.

Program/utility 914, having a set (at least one) of program modules 916, may be stored in memory 904 by way of example, and not limitation, as well as an operating system, one or more application programs, other program modules, and program data. Each of the operating system, one or more application programs, other program modules, and program data or some combination thereof, may include an implementation of a networking environment. Program modules 916 generally carry out the functions and/or methodologies of embodiments of the invention as described herein.

The computer system/server 900 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of computer system/server 900 via bus 906. It should be understood that although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

Additionally, the system for updating of a repetition frequency of a system scan operation 800 may be attached to the bus system 906.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for updating a repetition frequency of system scan operations for a computer system using an asset management system, the method comprising:
    calculating values of a plurality of asset management factors based on results of comparisons of related one or more asset management factors from a current system scan operation and a previously performed system scan operation, wherein groups of computer systems are treated as node equivalents of a neural network equivalent and the asset management factors are treated as synapse equivalents of the node equivalents, and wherein the asset management factors further comprises a number of software packages installed on the computer system;
    feeding values of the asset management factors and related weighing values for each of the asset management factors as input into a summing module for determining an update value for the repetition frequency as output, wherein the weighing value is based on a self-learning capability of the neural network equivalent and wherein the self-learning capability of the neural network equivalent is based on a multidimensional neural network machine learning technique in which the related weighing values for each of the asset management factors can be adjusted dynamically over time; and
    updating the repetition frequency using the update value by an activation function.

2. The method according to claim 1, wherein each of the groups comprises one system and wherein the weighing values are static.

3. The method according to claim 1, wherein each of the groups comprises one system and wherein the weighing values are determined dynamically during each iteration of the subsequent system scan operations.

4. The method according to claim 1, wherein the at least one of the groups comprises more than one computer system.

5. The method according to claim 4, wherein the weighing values are determined dynamically during each iteration of the subsequent system scan operations.

6. The method according to claim 1, wherein the asset management factors are selected from the group comprising:
    a number of software packages installed on the computer system, a number of included and/or excluded directories on the computer system,
a number of included and/or excluded local product instances on the computer system,
a number of computer systems to which an agent belongs performing the system scan operations,
an adherence of the computer system to a group,
a list of unconfirmed instances,
a number of recently performed successful system scan operations,
a number of duplicate agents,
a last agent response time of the agent, and
a quarter report submission factor.

7. The method according to claim 1, wherein the computer system is selected out of the group comprising a personal computer, a server computer, a mobile device a disk subsystem, network system, and a peripheral system to the computer system.

8. A computer system for updating of a repetition frequency of system scan operations for a computer system using an asset management system, the computer system comprising:
one or more computer processors;
one or more non-transitory computer readable storage media;
program instructions stored on the one or more non-transitory computer readable storage media for execution by at least one of the one or more computer processors, the program instructions comprising:
program instructions to calculate values of asset management factors based on results of comparisons of related ones of the asset management factors from a current system scan operation and a previously performed system scan operation, wherein groups of computer systems are treated as node equivalents of a neural network equivalent and said asset management factors are treated as synapse equivalents of said node equivalents, and wherein the asset management factors further comprises a number of software packages installed on the computer system;
program instructions to feed values of said asset management factors and related weighing values for each of said asset management factors as input into a summing module for determining an update value for said repetition frequency as output, wherein said weighing value is based on a self-learning capability of said neural network equivalent and wherein the self-learning capability of the neural network equivalent is based on a multidimensional neural network machine learning technique in which the related weighing values for each of the asset management factors can be adjusted dynamically over time; and
program instructions to update said repetition frequency using said update value by an activation function.

9. The computer system according to claim 8, wherein each of said groups comprises one system and wherein said weighing values are static.

10. The computer system according to claim 8, wherein each of the groups comprises one system and wherein the weighing values are determined dynamically during each iteration of the subsequent system scan operations.

11. The computer system according to claim 8, wherein the at least one of the groups comprises more than one computer system.

12. The computer system according to claim 11, wherein the weighing values are determined dynamically, during each iteration, of the subsequent system scan operations.

13. The computer system according to claim 8, wherein said asset management factors are selected out of the group comprising:
a number of software packages installed on the computer system,
a number of included and/or excluded directories on the computer system,
a number of included and/or excluded local product instances on the computer system,
an adherence of the computer system to a group,
a number of computer systems to which an agent belongs performing the system scan operations,
a list of unconfirmed instances,
a number of recently performed successful system scan operations,
a number of duplicate agents,
a last agent response time of the agent, and
a quarter report submission factor.

14. A computer program product for updating of a repetition frequency of a system scan operation for a computer system using an asset management system, the computer program product comprising:
one or more non-transitory computer readable storage media and program instructions stored on the one or more non-transitory computer readable storage media, the program instructions comprising:
program instructions to calculate values of asset management factors based on results of comparisons of related ones of the asset management factors from a current system scan operation and a previously performed system scan operation, wherein groups of computer systems are treated as node equivalents of a neural network equivalent and the asset management factors are treated as synapse equivalents of the node equivalents, and wherein the asset management factors further comprises a number of software packages installed on the computer system;
program instructions to feed values of the asset management factors and related weighing values for each of the asset management factors as input into a summing module for determining an update value for the repetition frequency as output, wherein the weighing value is based on a self-learning capability of the neural network equivalent and wherein the self-learning capability of the neural network equivalent is based on a multidimensional neural network machine learning technique in which the related weighing values for each of the asset management factors can be adjusted dynamically over time; and
program instructions to update the repetition frequency using the update value by an activation function.

15. The computer program product according to claim 14, wherein each of said groups comprises one system and wherein said weighing values are static.

16. The computer program product according to claim 14, wherein each of the groups comprises one system and wherein the weighing values are determined dynamically during each iteration of the subsequent system scan operations.

17. The computer program product according to claim 14, wherein the at least one of the groups comprises more than one computer system.

18. The computer program product according to claim 17, wherein the weighing values are determined dynamically, during each iteration, of the subsequent system scan operations.

19. The computer program product according to claim 14, wherein the asset management factors are selected out of the group comprising:
- a number of software packages installed on the computer system,
- a number of included and/or excluded directories on the computer system,
- a number of included and/or excluded local product instances on the computer system,
- an adherence of the computer system to a group,
- a number of computer systems to which an agent belongs performing the system scan operations,
- a list of unconfirmed instances,
- a number of recently performed successful system scan operations,
- a number of duplicate agents,
- a last agent response time of the agent, and
- a quarter report submission factor.

* * * * *